(12) United States Patent
Nagano et al.

(10) Patent No.: US 9,204,089 B2
(45) Date of Patent: Dec. 1, 2015

(54) DISPLAY APPARATUS EQUIPPED WITH IMAGE PICKUP APPARATUS

(71) Applicant: CANON KABUSHIKI KAISHA, Tokyo (JP)

(72) Inventors: Akihiko Nagano, Ichihara (JP); Hiroshi Akada, Kawasaki (JP); Chifuyu Tomita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 13/676,982

(22) Filed: Nov. 14, 2012

(65) Prior Publication Data
US 2013/0127976 A1 May 23, 2013

(30) Foreign Application Priority Data
Nov. 17, 2011 (JP) ................. 2011-251748

(51) Int. Cl.
*H04N 5/225* (2006.01)
*H04N 7/14* (2006.01)

(52) U.S. Cl.
CPC ............... *H04N 7/144* (2013.01); *H04N 5/225* (2013.01)

(58) Field of Classification Search
CPC G02B 17/00–17/0896; G02B 21/00–21/0368; G02B 26/00–26/129; H04N 1/00127–1/00201; H04N 1/00249–1/00275; H04N 1/00496; H04N 1/00557; H04N 1/00559; H04N 1/024–1/0281; H04N 1/03–1/0318; H04N 2101/00

USPC ................. 348/14.01–14.16, 207.99–210.99, 348/218.1, 262–265, 332

See application file for complete search history.

(56) References Cited

U.S. PATENT DOCUMENTS

| | | | | |
|---|---|---|---|---|
| 7,714,923 | B2* | 5/2010 | Cok et al. ................. | 348/333.01 |
| 8,154,582 | B2* | 4/2012 | Border et al. .............. | 348/14.08 |
| 8,223,188 | B2* | 7/2012 | Ryf et al. ................... | 348/14.01 |
| 8,384,760 | B2* | 2/2013 | Tan .............................. | 348/14.16 |
| 8,390,671 | B2* | 3/2013 | Kanade et al. ............. | 348/14.16 |
| 8,520,114 | B2* | 8/2013 | Cok et al. ................. | 348/333.01 |
| 8,576,325 | B2* | 11/2013 | Dudek et al. .................. | 348/344 |
| 2005/0128332 | A1* | 6/2005 | Tsuboi ..................... | 348/333.12 |
| 2007/0002130 | A1* | 1/2007 | Hartkop ..................... | 348/14.16 |
| 2011/0279689 | A1* | 11/2011 | Maglaque .................. | 348/207.1 |

FOREIGN PATENT DOCUMENTS

| | | |
|---|---|---|
| JP | 2005-176151 A | 6/2005 |
| JP | 2009-187697 A | 8/2009 |

* cited by examiner

*Primary Examiner* — Hemant Patel
(74) *Attorney, Agent, or Firm* — Canon USA Inc. IP Division

(57) ABSTRACT

A display apparatus includes a display unit configured to display image information, and a plurality of image pickup units configured to be capable of picking up a user who observes image information of the display unit arranged on a rear surface of a display surface of the display unit, wherein the plurality of image pickup units is two-dimensionally arranged, and an array pitch in a vertical direction of the image pickup units is wider than an array pitch in a horizontal direction.

12 Claims, 7 Drawing Sheets

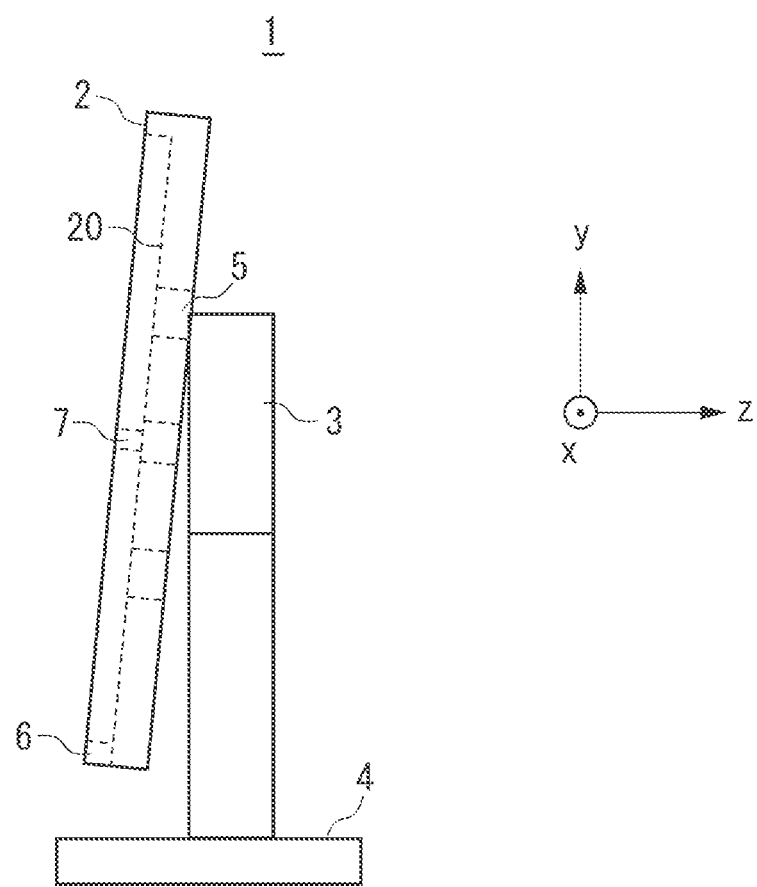

DISPLAY APPARATUS EQUIPPED WITH IMAGE PICKUP APPARATUS

BACKGROUND OF THE INVENTION

1. Field of the Invention

The present invention relates to a display apparatus equipped with image pickup apparatus suitable for real time bidirectional communication such as a videophone.

2. Description of the Related Art

In recent years, real time bidirectional communication such as a videophone have become available owing to remarkable development of communication network. The videophone includes an image pickup unit that converts an object image into an electric image signal and a display unit that converts the electric image signal into an optical signal and displays the optical signal. A user of the videophone has a conversation while viewing a face of the other party projected on a screen of the display unit. At the same time, the face of the user is picked up by the image pickup unit, and is sent to the other side, after being converted into the electric signal. However, in equipment used for bidirectional communication such as the conventional TV videophone, the image pickup unit is provided adjoining to the display unit or as a separate independent device, and results in picking up a recipient who is viewing the display unit from an oblique direction. Therefore, there is a problem that a line of sight of a face of the other party projected on the display unit is directed toward different point, and there is awkwardness even when two parties are mutually talking, and there is feeling of strangeness as compared with face-to-face talking. In addition, there is another problem that there is the need to separately manufacture and assemble an image pickup apparatus and a display apparatus, or configure the both devices as discreet apparatuses, and thus manufacturing cost becomes high.

Thus, the present applicant discusses in Japanese Patent Application Laid-Open No. 2005-176151 a display apparatus equipped with image pickup apparatus including a display unit that includes a plurality of display pixels and light shielding members arranged between respective display pixels of the plurality of display pixels, and an image pickup unit arranged in the rear of the display unit. Then, the display apparatus includes an opening at a portion of the light shielding members for guiding a light to the image pickup unit, and the image pickup unit includes an image forming unit at a position corresponding to the opening.

The display apparatus equipped with the image pickup apparatus in the above-described patent enables image pickup while the user is viewing the display unit, and enables coming eye to eye with the other party displayed on the display unit. Further, the entire device will no more grow in size by providing a thin image pickup unit on the front surface of the display unit.

However, a position of face of the other party projected on the screen of the display unit does not necessarily correspond to a position of the image pickup unit arranged within the screen. Further, the position of the user who looks at the face of the other party projected at a position deviated relative to the position of the image pickup unit arranged within the screen of the display unit, may be deviated in some cases to coincide with the position of the face of the other party.

FIG. 7 is a top plan view illustrating a deviation between a direction of a line of sight of a user who gazes a display unit such as a videophone and a direction of an image pickup unit. In FIG. 7, a display panel 20 serves as a display unit at which a user 10 looks, and a camera 5 serves as an image pickup unit. Further, a x mark 11 indicates a position of the face of the other party displayed on the display panel 20.

FIG. 7 is an explanatory view of a conventional display apparatus equipped with image pickup apparatus, and the camera 5 that shoots the user is incorporated into the display panel 20. In FIG. 7, a face 11 of the other party is displayed at a position (position indicated by the x mark in FIG. 7) deviated in the −x direction (horizontal direction) in FIG. 7 relative to the position of the camera 5, and the user 10 gazes the face 11 of the other party from a position deviated from an optical axis (z-axis) of the camera 5. In that process, the shooting direction in which the camera 5 shoots the user 10 and the line of sight direction of the user 10 are deviated by a predetermined angle θ. When the angle θ is large, a person at the other side of the videophone who looks at an image of the user shot by the camera 5 recognizes that the user is having a conversation without looking at his or her face.

To make the person of the other side the videophone who has looked at the image of the user shot by the camera 5 to recognize that the user is looking at him or her, the angle θ formed by the shooting direction in which the camera 5 shoots the user 10 and the line of sight direction of the user 10 needs to be reduced.

To reduce the angle θ formed by the shooting direction in which the camera 5 shoots the user 10 and the line of sight direction of the user 10, Japanese Patent Application Laid-Open No. 2005-176151 discusses a technique in which a plurality of cameras 5 is arranged on the display panel 20. By doing so, the angle θ formed by the shooting direction in which the camera 5 that is one set of the plurality of cameras shoots the user 10 and the line of sight direction of the user 10 becomes smaller, and the person of the other side who has looked at the image of the user shot by the camera 5 becomes able to recognize that the user is looking at him or her.

However, to reduce the angle θ formed by the line of sight direction of the user 10 who gazes the person of the other side displayed at any given position of the display panel 20 and the shooting direction in which the camera 5 shoots the user 10, a lot of cameras 5 needs to be arranged near the rear surface of the display panel 20. As a result, there is a drawback that it incurs manufacturing cost.

SUMMARY OF THE INVENTION

The present invention is directed to a display apparatus equipped with image pickup apparatus capable of suppressing an increase in manufacturing cost to a minimum.

According to an aspect of the present invention, a display apparatus includes a display unit configured to display image information, and a plurality of image pickup units configured to be capable of picking up a user who observes image information of the display unit arranged on a rear surface of a display surface of the display unit, wherein the plurality of image pickup units is two-dimensionally arranged, and an array pitch in a vertical direction of the image pickup units is wider than an array pitch in a horizontal direction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a side view of the exemplary embodiment.

DESCRIPTION OF THE EMBODIMENTS

Various exemplary embodiments, features, and aspects of the invention will be described in detail below with reference to the drawings.

Figure 1A:
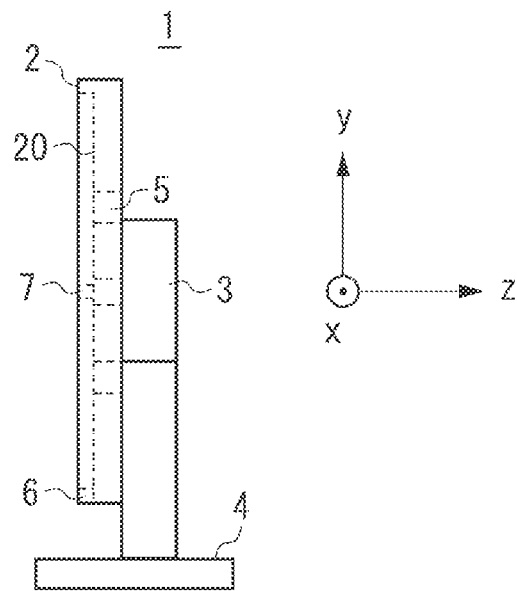
FIGS. 1A and 1B each illustrates an exemplary embodiment of a display apparatus equipped with an image pickup apparatus according to the present invention.
Figure 1B:
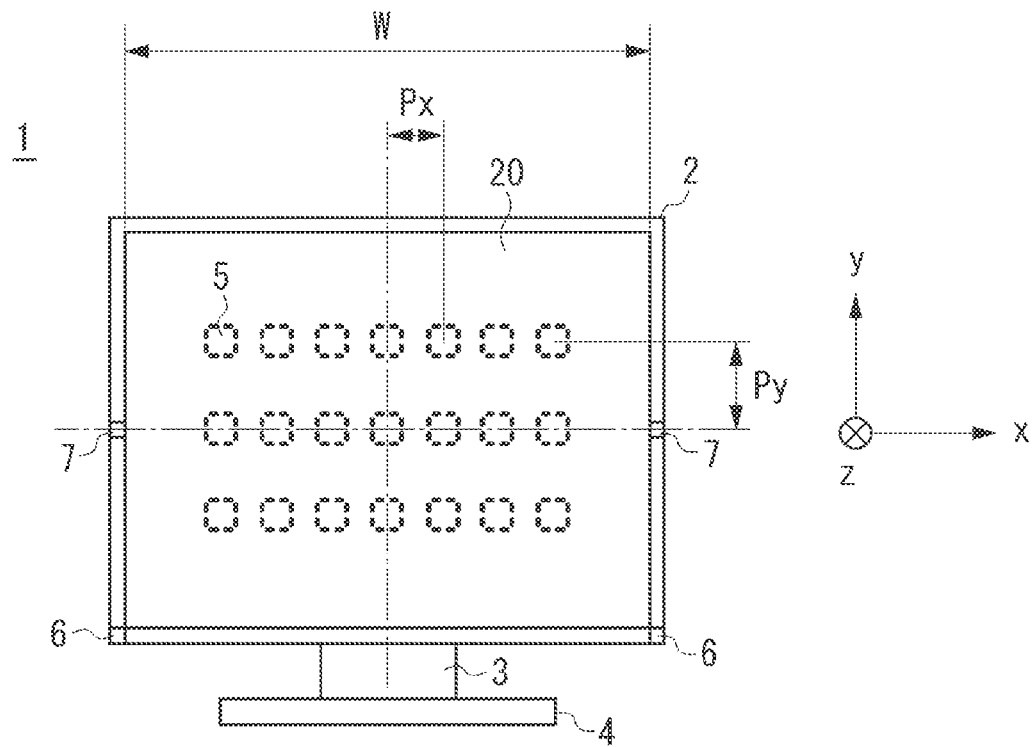
Figure 3:
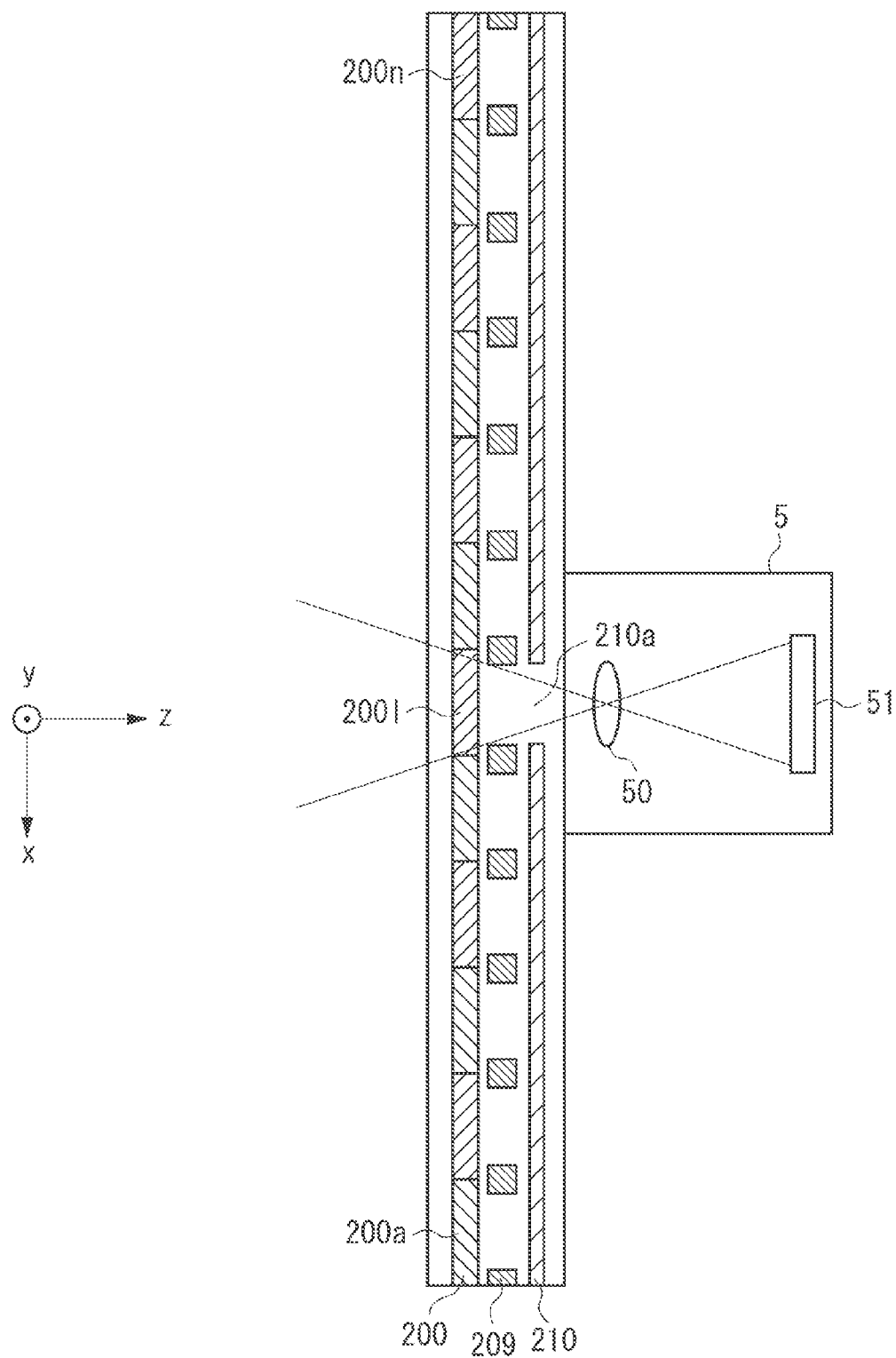
FIG. 3 is a horizontal cross-sectional view illustrating a part of the display panel according to the exemplary embodiment.
Figure 4:
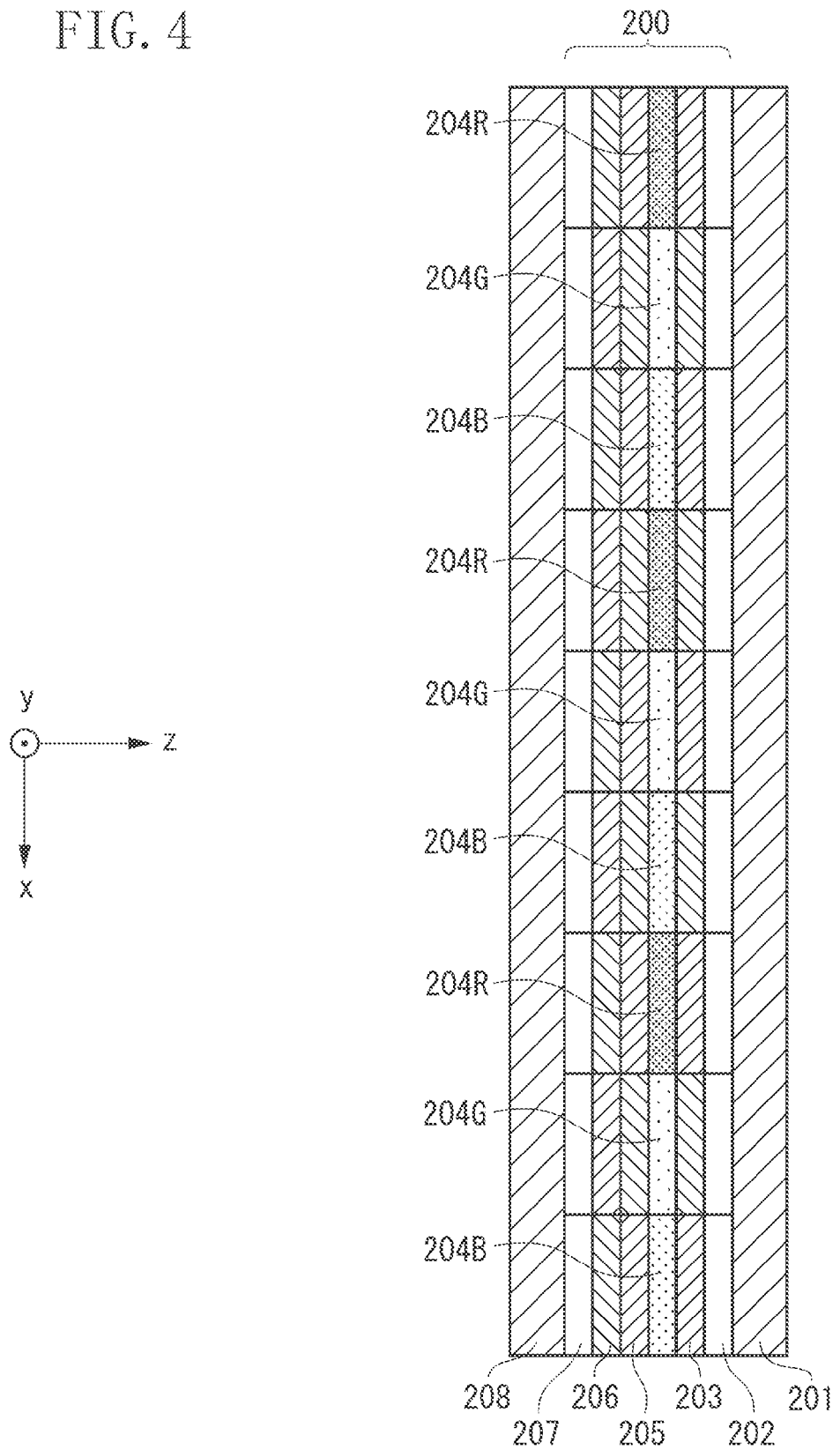
FIG. 4 is a horizontal cross-sectional view illustrating the detail of the display panel according to the exemplary embodiment.
Figure 5:
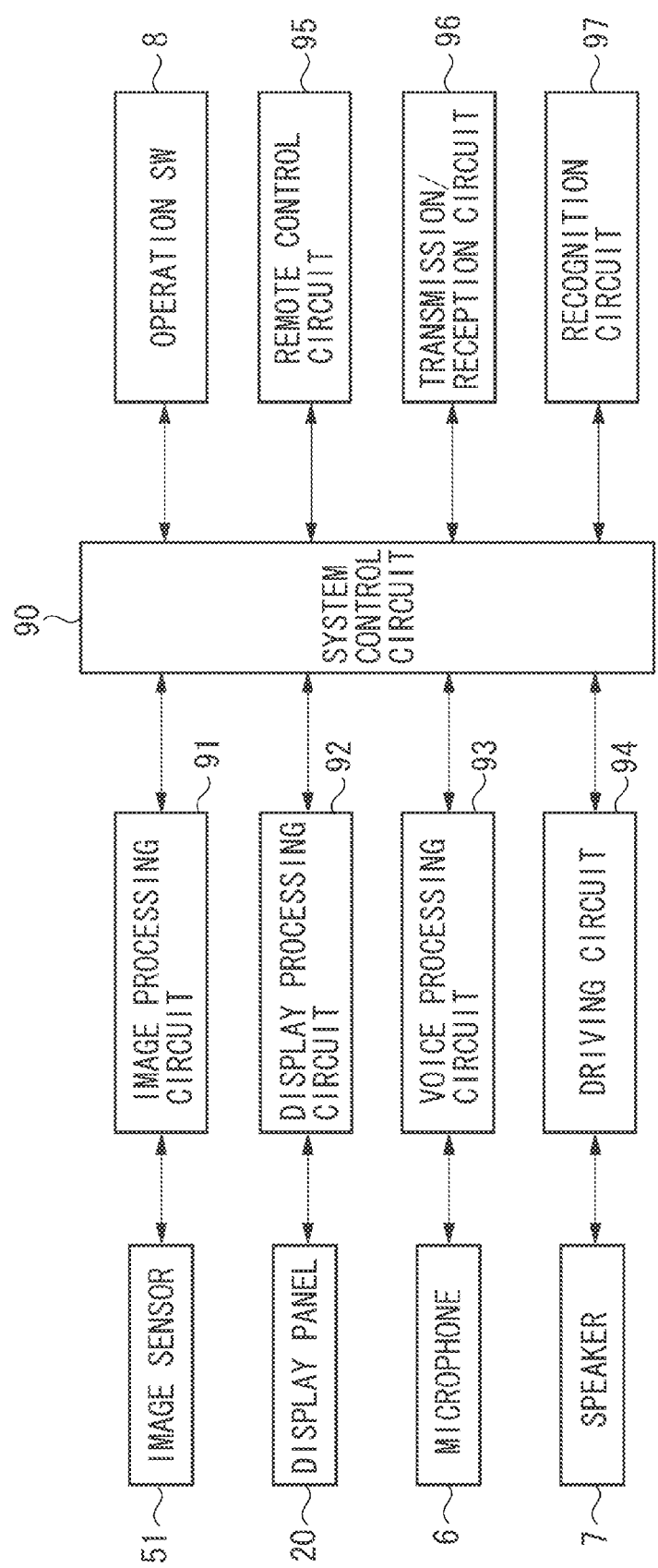
FIG. 5 is a block diagram illustrating a circuit configuration of the exemplary embodiment.
Figure 6:
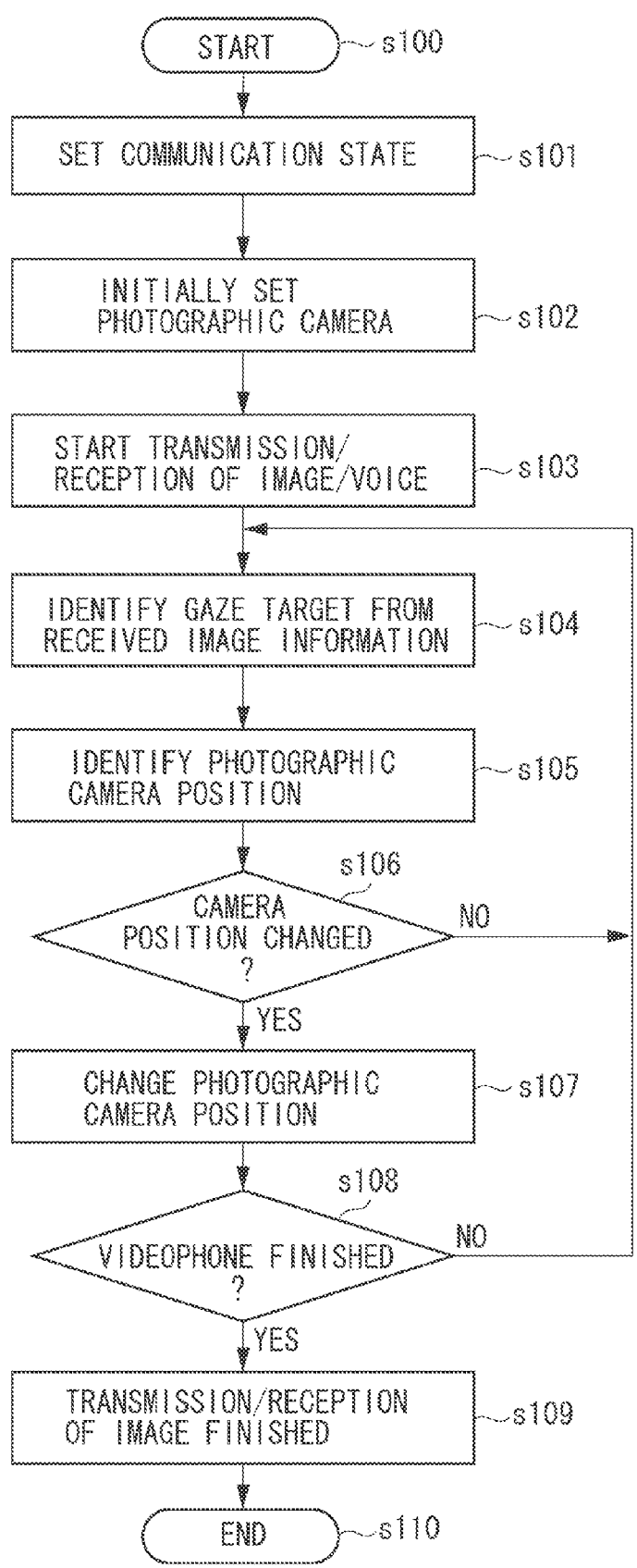
FIG. 6 is a flowchart illustrating an operation of the exemplary embodiment.
Figure 7:
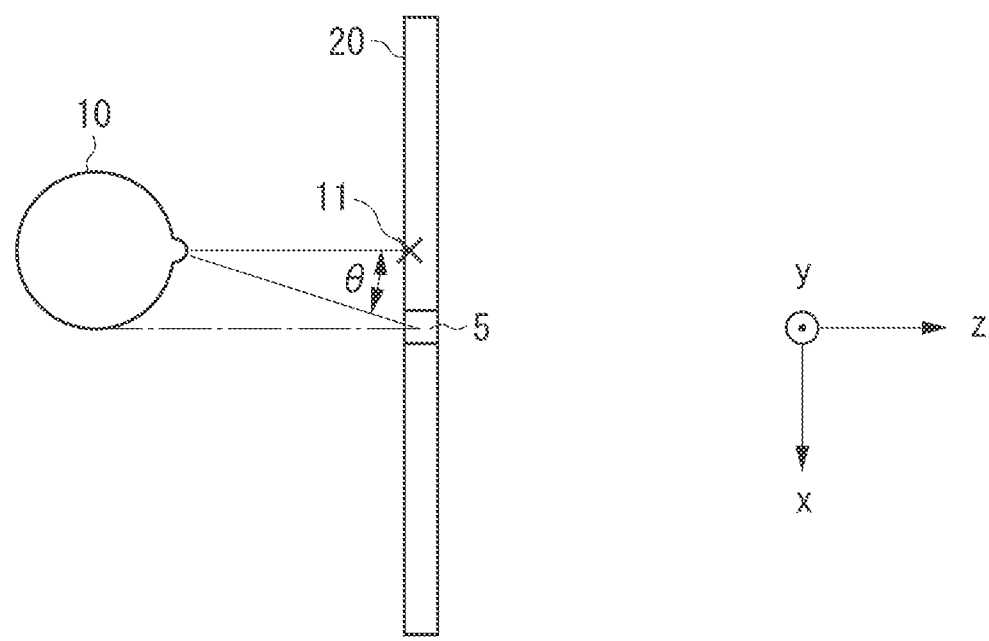
FIG. 7 is a view for illustrating a deviation between a direction of a line of sight of a user and a direction of an image pickup unit.

FIGS. 1A and 1B through FIG. 5 each illustrates an exemplary embodiment of a display apparatus equipped with image pickup apparatus according to the present invention including a plurality of cameras (image pickup units) serving as an image pickup apparatus. FIG. 1A is a side view of the exemplary embodiment, FIG. 1B is a front view of the exemplary embodiment, FIG. 2 is a side view of the exemplary embodiment, FIG. 3 is a horizontal cross-sectional view of a part of the display panel in the exemplary embodiment, and FIG. 4 is a horizontal cross-sectional view illustrating the details of the display panel. Further, FIG. 5 is a block diagram illustrating a circuit configuration of the exemplary embodiment, and FIG. 6 is a flowchart illustrating an operation of the exemplary embodiment.

FIGS. 1A and 1B each is an explanatory view of a display apparatus equipped with image pickup apparatus 1 used in a videophone or a videoconference system. A display panel 20 serves as a display unit capable of transmitting a light, and corresponds to a display unit that displays image information. The display panel 20 is incorporated into a display panel frame member 2. A leg portion 3 is provided on the rear surface (+z-direction in FIG. 1A) of the display panel frame member 2, and the display apparatus equipped with image pickup apparatus 1 is designed to stand upright by a pedestal 4 fixed to the leg portion 3.

On the rear surface (+z-direction in FIG. 1A) of the display panel 20, there is arranged a plurality of the cameras 5 serving as the image pickup units for shooting the user who observes image information (e.g., when used for the videophone, a face of the other party with whom having a conversation) of the display panel 20. In the present exemplary embodiment, the cameras 5 with three rows in a vertical (y) direction, and seven columns in a horizontal (x) direction are two-dimensionally arranged on a surface parallel with the display surface of the display panel 20.

An array pitch Px of the cameras 5 in the horizontal (x) direction for making the person at the other side with whom having a conversation on the videophone, for example, to recognize that the user is looking at him or her (the person of the other side) depends on a width W of the display panel 20, and is adapted to satisfy, for example, the following expression (1)

$$W/30 \leq Px \leq W/10 \tag{1}$$

In the present exemplary embodiment, an array pitch Py in the vertical direction of the cameras 5 is configured to be wider than the array pitch Px in the horizontal direction. The reason why the array pitch Py in the vertical direction is different from the array pitch Px in the horizontal direction of the cameras 5 is because it is difficult for the person of the other side who has looked at the image of the user to recognize a deviation of a line of sight in the vertical direction. As a result, the array pitch Py in the vertical direction of the camera 5 is coarser relative to the array pitch Px in the horizontal direction. At that time, the array pitch Py in the vertical direction of the cameras 5 is configured to satisfy, for example, the following expression (2), relative to the array pitch Px in the horizontal direction.

$$2Px \leq Py \leq 3Px \tag{2}$$

In other words, the array pitch Py in the vertical direction is two times or more as large as the array pitch Px in the horizontal direction, and three times or less as large as the array pitch Px in the horizontal direction.

In this way, in present the exemplary embodiment, a number of the cameras 5 arranged in the display apparatus equipped with the image pickup apparatus 1 is reduced, and the cost is cut down, by configuring the angle formed by the line of sight direction of the user and the shooting direction in which the camera 5 shoots the user to be made smaller in the horizontal direction, and to be made larger in the vertical direction than in the horizontal direction.

Further, around the display panel 20, a microphone 6 that picks up a voice of the user and a speaker 7 that conveys a voice of the other side are arranged.

Furthermore, the display panel frame member 2 and the leg portion 3 of the display apparatus equipped with the image pickup apparatus 1 are interconnected by a hinge (not illustrated). Therefore, the display panel frame member 2 is rotatable about the x-axis direction in FIG. 2 with respect to the leg portion 3.

In the side view of the display apparatus equipped with the image pickup apparatus 1 in FIG. 2, a state is illustrated in which the angle of the display panel frame member 2 is changed to make it easier for the user to view the image information to be displayed while looking straight forward. In this case, since the camera 5 rotates integrally with the display panel frame member 2, the image of the user can be picked up substantially from the front even if the angle of the display panel frame member 2 is changed to make it easier for the user to look at the displayed image.

FIG. 3 is an enlarged horizontal cross-sectional view of a part of the display panel 20, and the display panel 20 is constituted by an organic electroluminescence (EL) capable of transmitting a light. FIG. 4 is an enlarged horizontal cross-sectional view of a part of an organic EL layer. A −z direction in FIG. 3 or 4 is display surface direction.

In FIG. 3, thin film transistors (TFTs) 209 for switching and driving are situated on a rear surface side (+z direction side) of an organic EL layer 200. The TFTs 209 are formed of polysilicon or the like, and are arranged on boundary portions of respective display pixel portions 200a through 200n. Further, the TFTs 209 made of aluminum or the like are situated on a rear surface side (+z direction side) of a light shielding member 210 and an opening 210a is provided in the middle thereof.

The display panel 20 according to the present exemplary embodiment is a top emission type organic EL panel that includes an organic EL layer 200 on the display surface side, and includes the TFTs 209 on the rear surface side.

The camera 5 includes a photographic lens 50 and an image sensor 51, and is designed to shoot the user through one display pixel portion 2001 of the display panel 20. More specifically, the image sensor 51 is designed to receive a light between the TFTs 209 arranged at boundary portions of the respective display pixel portions 200a through 200n, via the photographic lens 50 and the opening 210a of the light shielding member 210. Further, the light shielding member 210 is used to prevent a stray light from entering into the image sensor 51, from the display pixel portions adjacent to the display pixel portion 2001.

FIG. 4 is an enlarged horizontal cross-sectional view of a part of the display panel 20 including the organic EL layer 200. The organic EL layer 200 includes a planarization layer 201, an anode 202 made of transparent indium tin oxide (ITO), a hole transport layer 203, a light-emitting layer 204, an electron transport layer 205, an electron injection layer 206, a cathode 207 made of ITO, and a planarization layer 208. Of the light-emitting layer 204 in FIG. 4, a light-emitting layer 204R that emits a red light, and a light-emitting layer 204G that emits a green light, and a light-emitting layer 204B that emits a blue light are arrayed in three-pixel period in the x-direction (in a lengthwise direction of the display panel 20) in FIG. 4. The details of configuration of the organic EL layer 200 are discussed in Japanese Patent Application Laid-Open No. 2009-187697 by the present applicant.

Next, control operation in a case where the display apparatus equipped with the image pickup apparatus 1 is used as the videophone will be described with reference to the block diagram of the display apparatus equipped with the image pickup apparatus 1 in FIG. 5, and the operational flowchart of the display apparatus equipped with the image pickup apparatus 1 in FIG. 6.

In the flowchart in FIG. 6, in step S100, when the user of the videophone operates an operation switch 8 of the display apparatus equipped with the image pickup apparatus 1 serving as the videophone, to start up the videophone, a system control circuit 90 serving as a control circuit of the display apparatus equipped with the image pickup apparatus 1 receives information of the other party via a remote control circuit 95 from an operation of the user by a remote control or the like. Furthermore, in step S101, the system control circuit 90 sets a communication state with the other side of the TV telephone, based on the information of the other party obtained from the operation of the user, via a transmission/reception circuit 96. Subsequently in step S102, the system control circuit 90 initially sets as a camera that shoots the user, the camera 5 positioned in the middle of the display panel 20, of the plurality of cameras 5 arranged in the display apparatus equipped with the image pickup apparatus 1. An image shot by the image sensor 51 of the camera 5 is processed by the image processing circuit 91 and becomes transmittable to the other side. At the same time, the voice of the user is picked up by the microphone 6, and is processed by the audio processing circuit 93 and becomes transmittable to the other side. In step S103, when it has become possible to shoot the user by the camera 5, the system control circuit 90 starts transmission/reception of images and voices to/from the other side of the TV telephone via the transmission/reception circuit 96.

Next, upon receiving images and stereo audio transmitted from the other side of the TV telephone via the transmission/reception circuit 96, the system control circuit 90 displays images of the other side on the display panel 20, via the display processing circuit 92. At the same time, the system control circuit 90 outputs the voices of the other side from the speaker 7 via the driving circuit 94.

Furthermore, a recognition circuit 97 identifies a position (gaze target) of eye of the person at the other side displayed on the display panel 20, from an image transmitted from the other side of the TV telephone. In that case, when a plurality of persons is included in the image of the other side, in step S104, the recognition circuit 97 analyzes transmitted stereo audio to identify a speaker, and identifies a position of an eye of the speaker.

When a position of the eye of the person, at whom the user is going to gaze, at the other side on the display panel 20 is identified, in step S105, the system control circuit 90 identifies a camera 5 closest to the position of eye of the person at the other side displayed on the display panel 20.

In step S106, the system control circuit 90 compares a position of the camera currently being set and a position of the camera identified from a position of the eye of the speaker of the other side of the videophone. If the position of the camera currently being set and the position of the camera identified from the position of the eye of the speaker at the other side of the videophone are different from each other (Yes in step S106), in step S107, the system control circuit 90 changes a camera which shoots the user.

Subsequently, in step S108, the system control circuit 90 checks for a state of the operation switch 8. If the videophone remains in use (NO in step S108), in step S104, the system control circuit 90 analyzes again an image transmitted from the other side of the videophone, to identify a position of the eye of the person at the other side displayed on the display panel 20.

On the other hand, in step S108, if the system control circuit 90 confirms that the operation switch 8 is turned off by the user (Yes in step S108), in step S109, the system control circuit 90 ends transmission/reception to/from the other side of the videophone. Furthermore, in step S110, the system control circuit 90 ends shooting of the user by the camera 5, and ends display of an image received from the other side onto the display panel 20.

In the present exemplary embodiment, there has been illustrated an example in which the recognition circuit 97 identifies a speaker in a displayed image, based on received images and voice information, and the system control circuit 90 selects one of the cameras 5 which shoots the user based on this, but it may be configured to combine an image from a camera which substantially matches a speaker in the displayed image and a plurality of cameras arranged around it.

Further, in the present exemplary embodiment, an example in which the recognition circuit 97 identifies a speaker in the displayed image based on received images and voice information sent from the other side has been illustrated. However, it is also effective to configure a system in such a manner to recognize position information of the user from an image of the user shot by the camera 5 and voice picked up by the microphone 6, and to transmit the position information of the user to the other side of the videophone.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-251748 filed Nov. 17, 2011, which is hereby incorporated by reference herein in its entirety.

What is claimed is:

1. A display apparatus comprising:
a display unit configured to display image information; and
a plurality of image pickup units configured to be capable of picking up an image of a user who observes image information of the display unit, wherein the plurality of image pickup units is arranged on a rear surface of a display surface of the display unit,
wherein the plurality of image pickup units is two-dimensionally arranged, and an array pitch in a vertical direction of the image pickup units is wider than an array pitch in a horizontal direction.

2. An array pitch in a vertical direction of the image pickup units of the display apparatus according to claim 1 is two times or more as large as an array pitch in a horizontal direction, and three times or less as large as an array pitch in a horizontal direction.

3. An array pitch in a horizontal direction of the image pickup units according to claim 1 is determined according to a size of the display unit.

4. An array pitch in a horizontal direction of the image pickup units according to claim 2 is determined according to a size of the display unit.

5. The display apparatus according to claim 1, further comprising a controller,
wherein the controller selects at least one of the plurality of image pickup units to thereby shoot a user, and
wherein the controller performs selection based on image information to be displayed on the display unit.

6. The display apparatus according to claim 2, further comprising a controller,
wherein the controller selects at least one of the plurality of image pickup units to thereby shoot a user, and
wherein the controller performs selection based on image information to be displayed on the display unit.

7. The display apparatus according to claim 3, further comprising a controller,
wherein the controller selects at least one of the plurality of image pickup units to thereby shoot a user, and
wherein the controller performs selection based on image information to be displayed on the display unit.

8. The display apparatus according to claim 4, further comprising a controller,
wherein the controller selects at least one of the plurality of image pickup units to thereby shoot a user, and
wherein the controller performs selection on image information to be displayed on the display unit.

9. The controller of the display apparatus according to claim 5, when used for a videophone, selects the image pickup unit close to a target which another party gazes.

10. The controller of the display apparatus according to claim 6, when used for a videophone, selects the image pickup unit close to a target which another party gazes.

11. The controller of the display apparatus according to claim 7, when used for a videophone, selects the image pickup unit close to a target which another party gazes.

12. The controller of the display apparatus according to claim 8, when used for a videophone, selects the image pickup unit close to a target which another party gazes.

* * * * *